United States Patent [19]

James et al.

[11] Patent Number: 5,895,496
[45] Date of Patent: Apr. 20, 1999

[54] SYSTEM FOR AN METHOD OF EFFICIENTLY CONTROLLING MEMORY ACCESSES IN A MULTIPROCESSOR COMPUTER SYSTEM

[75] Inventors: David V. James, Palo Alto; Glen D. Stone, San Jose, both of Calif.

[73] Assignee: Apple Computer, Inc., Cupertino, Calif.

[21] Appl. No.: 08/972,559

[22] Filed: Nov. 18, 1997

Related U.S. Application Data

[63] Continuation of application No. 08/794,479, Feb. 4, 1997, abandoned, which is a continuation of application No. 08/342,131, Nov. 18, 1994, abandoned.

[51] Int. Cl.$^6$ .............................. G06F 12/00; G06F 13/00
[52] U.S. Cl. .................... 711/163; 711/100; 711/141; 711/144; 711/145; 711/154
[58] Field of Search ................... 711/3, 100, 118, 711/130, 141, 144, 145, 154, 163

[56] References Cited

U.S. PATENT DOCUMENTS

| | | | |
|---|---|---|---|
| 4,484,267 | 11/1984 | Fletcher | 395/451 |
| 4,622,631 | 11/1986 | Frank et al. | 395/800 |
| 5,130,922 | 7/1992 | Liu | 395/471 |
| 5,136,691 | 8/1992 | Baror | 371/20.4 |
| 5,206,941 | 4/1993 | Eikill et al. | 395/469 |
| 5,247,643 | 9/1993 | Shottan | 395/470 |
| 5,283,886 | 2/1994 | Nishii et al. | 395/471 |
| 5,297,269 | 3/1994 | Donaldson et al. | 395/472 |
| 5,325,503 | 6/1994 | Stevens et al. | 395/473 |
| 5,325,504 | 6/1994 | Tipley et al. | 395/455 |
| 5,353,428 | 10/1994 | Shibata | 395/472 |
| 5,361,342 | 11/1994 | Tone | 395/448 |

OTHER PUBLICATIONS

"Directory–Based Cache Coherence in Large–Scale Multiprocessor" by David Chaihen, et al., Jun. 1990, pp. 49–57.
"Scalable Shared–Memory Multiprocessor Architectures", Shreekart Thakkar, Jun. 1990, pp. 71–74.

"A Hierarchical Directory Scheme for Large–Scale Cache Coherent Multiprocessors", Yeong–Chang Maa, Aug. 1992, pp. 43–45.

"An Efficient Single Copy Cache Coherence Protocol for Multiprocessors with Multistage Interconnection Networks", Aug. 1994, Ragab A. Omram pp. 1–4.

"A multi–cache coherence scheme for shuffle–exchange network based multiprocessors", Sep. 1995, Ragab A. Omran pp. 72–77.

*Primary Examiner*—Tod R. Swann
*Assistant Examiner*—Tuan V. Thai
*Attorney, Agent, or Firm*—Fenwick & West LLP

[57] ABSTRACT

A system for controlling memory accesses in a memory device in a multi-processor computer system comprises a memory controller and a data storage. The data storage comprises a plurality of memory lines. Each memory line has a check field for storing a GONE code that indicates that the data is held in a cache, a g bit field for storing a G bit for confirming the code in the check field, a tag field for storing an identification of the processor in whose cache the data is held, and a d bit field for storing the true value of the G bit in rare situations. The memory controller comprises a data buffer, an address buffer, and a memory sequencer. The memory sequencer is a state machine for controlling the functions of the memory device. The method includes the steps of reading a memory line; determining if the data contained in a check field portion of the memory line matches a GONE code generated from the address of the memory line; if the check field and GONE code values do not match, reading the data as data; if the check field and GONE match, checking the G bit; if the G bit is 1, outputting the address of the processor that holds the data in its cache; and if the G bit is 0, reconstructing the data from a D bit and outputting the data as data.

21 Claims, 9 Drawing Sheets

SYSTEM FOR AN METHOD OF EFFICIENTLY CONTROLLING MEMORY ACCESSES IN A MULTIPROCESSOR COMPUTER SYSTEM

RELATED APPLICATIONS

This is a continuation of application Ser. No. 08/794,479 filed Feb. 4, 1997, now abandoned, which is a continuation of application(s) Ser. No. 08/342,131 filed on Nov. 18, 1994, now abandoned.

BACKGROUND OF THE INVENTION

1. Field of the Invention

The present invention relates generally to computer systems having multiple processors with caches. In particular, the present invention relates to a system and method for implementing cache tags in a memory for maintaining cache coherence.

2. Description of the Background Art

The use of multiple processors is a recent trend in computer design. Each processor may work on a separate portion of a problem, or work on different problems, simultaneously. The processors used in the multi-processor architectures generally each have cache. A cache is a relatively small group, when compared to shared memories, of high speed memory cells that are specifically dedicated to a processor. A processor's cache is usually on the processor chip itself or may be on separate chips.

Processors use caches to hold data that the processor has recently accessed. A memory access is any action, such as a read or a write, where a processor receives, modifies, or receives as well as modifies the contents of a memory location. Generally, a processor can access data in its cache faster than it can access data in the main memory of the computer. Furthermore, by using data in its cache, a processor does not use the bus of the computer system to access data. This leaves the bus free for use by other processors and devices.

A particular problem associated with the use of caches is that the data becomes "stale." A first processor may access data in the main memory and copy the data into its cache. The first processor may then modify the data in its cache. At the instant when the data in the cache of the first processor is modified, the corresponding data in the memory is stale. If a second processor subsequently accesses the original data in the main memory, the second processor does not find the most current version of the data. The most current version is in the cache of the first processor. The second processor, however, needs the most current version of the data. A prior art solution to this problem is for processors to eavesdrop on the bus. When the first processor detects the main memory access by the second processor for data that the first processor holds in its cache, the first processor inhibits the main memory and supplies the data to the second processor. In this way, a processor always receives the most current version of the data.

This prior art solution suffers from a number of problems. Computer architectures are moving to multiple-processor, multiple-bus configurations. The busses are coupled through an interface. For efficiency purposes, many signals on a bus are not transmitted across the interface to other busses. Among signals, which are not transmitted across the interface, are memory access signals where the path between source and target devices does not cross the interface. Many other devices also do not transmit all signals that they receive. For example, cross-bar switches, which concurrently connect multiple pairs of source and target ports, limit the transmission of memory access signals to the data path between source and target. When devices do not transmit all memory access signals over its data path, it is impossible for processors, which are not the source and target, to eavesdrop on memory accesses and therefore, impossible to determine when the data is stale. Thus, this prior art solution is not effective in systems that use devices that do not transmit all memory access signals.

Decreases in access time of main memories and increases in the size of caches have created other problems with eavesdropping. Eavesdropping on the bus assumes that a processor can inhibit the main memory and place the data on the bus faster than the main memory can access the data. Memories may, however, cache copies of recently accessed data within themselves; in which case, they often can provide data before a processor can inhibit the memory. Also, caches have become larger. Generally, larger memories, whether main memories or caches, require more time to access. Processors, with large caches, cannot access the larger cache fast enough to make the prior art solution workable unless other memory access are delayed while eavesdropping is performed. Such a delay would significantly degrade the performance of the processor.

Memory tags have been used to overcome some of these problems. A memory tag is associated with a memory address whose data is held in a cache. When a processor copies the data at that address into its cache, a memory tag is updated to identify the processor in whose cache the data is held. If a second processor attempts to access the data in the memory, the processor will receive the memory tag. Memory tags remove the need for eavesdropping. The memory tags are held in a separate memory device called a tag storage. When a processor reads or writes data to a memory address, both the tag storage and the memory address are accessed. The memory address is accessed for the data, and the tag storage is accessed for the possibility of a memory tag. If the accesses are performed sequentially, two accesses greatly slow the operation of the memory. If done in parallel, the tag storage greatly complicates the design of the memory controller. The width of the tag storage differs from the width of the main memory, in one embodiment the tag storage is 20 bits wide and the main memory is 64 bits wide. The different sized memories require complicated modifications to the memory controller. Furthermore, the tag storage requires changes in the bus width and requires additional circuit chips that occupy space, consume power, and add to the expense of the computer system.

Referring now to FIG. 1, a block diagram of a prior art memory 23 is shown. The prior art memory 23 comprises a data storage 40, a tag storage 42, and a memory controller 25. The data storage 40 comprises a plurality of memory lines. Each memory line comprises one or more words and has an unique address. A first memory line 44 has address 0, and a second memory line 46 has address 1. Each address indicates a complete memory line. The remaining memory lines of the data storage 40 are addressed similarly so that a last memory line 48 has address N-1, where N is the total number of memory lines in the data storage 40. Each word has a fixed bit size. A word may be any number of bits long, but currently is preferably 64 bits long or other powers of 2. A memory line 44, 46, 48 may include any number of words, but within the data storage 40 each memory line 44, 46, 48 has the same number of words. The tag storage 42 comprises a tag cell for each memory line of the data storage 40. Each tag cell has an address that corresponds to a memory line of the data storage 40. A tag cell 50 has an address 0 and corresponds to the first memory line 44. Similarly, a tag cell 52 has an address 1 and corresponds to a second memory line 46, and a tag cell 54 has address N-1 and corresponds to a final memory line 48. Each tag cell 50, 52, 54 is more than one bit wide and contains data that indicates if the data held in the corresponding memory line 44, 46, 48 is valid data or if a processor holds the data. Data is valid, or "fresh," if no processor holds the data in its cache. Fresh data may also be referred to as "unowned" data. Data is referred to in this application as "owned" and is not fresh if a processor holds a copy of the data in its cache. If a processor owns the data, the tag cell 50, 52, 54 contains an indicator for indicating that the data is owned and a tag that identifies the processor that owns the data.

Any memory operation that requires the data held at an address is referred to as an access. The basic operations are ReadOwned and WriteReturn. ReadOwned and WriteReturn will be discussed in detail below. Other operations may also be performed. The processor that is executing an operation is referred to as the accessing processor. Every memory access requires an operation on the addressed memory line 44, 46, 48 and the assigned tag cell 50, 52, 54. This is true whether the memory access is a ReadOwned or a WriteReturn. If the access is a ReadOwned, the data storage 40 must be read, and the tag storage 42 must be read to determine if the data is fresh. If the memory access is a WriteReturn, the appropriate address must be written to and the assigned tag cell 50, 52, 54 must be set to indicate fresh data.

The memory controller 25 is a state machine for controlling the operation of the memory 23. The memory controller 25 is coupled to processors and other devices of a computer system by a bus 31. Data, control, and address signals are transmitted to the memory 23 on the bus 31. The memory controller is coupled to the data storage 40 by a line 27 and is coupled to the tag storage 42 by a line 29. In this application, a line refers to one or more wires. When the memory controller 25 receives a memory access signal, it must perform an operation on both the data storage 40 and the tag storage 42. For example, if the memory controller 25 receives a ReadOwned command on the bus 31 for a memory location in the data storage 40, the memory controller 25 first asserts a signal on line 27 for the data storage 40 to transmit the contents of the first memory line 44 to the memory controller 25. For purposes of this example, it will be assumed that the memory address was 0 for the first memory line 44. The data storage transmits the data on line 27. The memory controller 25 simultaneously asserts a signal on line 29 for the tag storage 42 to transmit the contents of tag cell 50 to the memory controller 25. The memory controller 25 determines if the data, received from the tag storage 42, indicates that the data contained in memory line 44 is owned. If the data contained in memory line 44 is unowned, the memory controller outputs the data onto the bus 31. If the data is owned, the memory controller 25 outputs the tag contained in the tag cell 50. Other memory accesses such as WriteReturn also require an operation on both the data storage 40 and the tag storage 42. This prior art memory 23 is slow and requires more complicated memory controller lines 27, 29.

As can be seen from the above example, there is a continuing need for a faster system and method for ensuring that processors receive fresh data and for identifying processors holding cached data. This system and method should not require modifications to other devices of a computer system.

SUMMARY OF THE INVENTION

The present invention overcomes the deficiencies and limitations of the prior art with a system and method for controlling memory accesses in a multi-processor computer system. The present invention advantageously provides a system for storing data that identifies valid data and identifies data held in a processor's cache without a separate tag storage. The present invention also advantageously reduces the number of read functions that must be executed to access a memory location.

The system comprises a data storage device and a memory controller. The data storage device comprises a plurality of memory lines, each memory line having an unique address. A memory line comprises one or more 64 bit words. Words having any number of bits, however, may be used. Each memory line comprises a check field, a g bit field, a tag field, and a data field. A small portion of the data storage is used for a plurality of d bit fields. Each memory line in the remaining portion of the data storage has an assigned d bit field. A memory line may contain data or codes; the codes indicate that a processor owns the data in the cache.

When a memory line contains unowned data, the data resides in the memory line as in a conventional memory device. The check field, g bit field, and tag field are used to hold the data along with the rest of the memory line.

When the memory line contains owned data, the data resides in a cache of a processor. The check field and tag fields contain codes; the check field code contains a GONE code and the tag field code is a encoded identifier of the processor that holds the data. Thus, on each memory access, the data is output, or the location of the data in a cache is output. As opposed to the prior art, a second memory access is generally not required. A special case occurs, however, when data is being held in a memory line that happens by chance to have a check field equal to GONE. In this case, the data in the data storage is unowned, but it appears that the data is owned. For this rare situation, the present invention advantageously uses a g bit field. The g bit field contains a G bit. Whenever the data is owned, the G bit is set to 1. If the data is in the memory line, but the data in the check field by chance matches the GONE value, the G bit is set to 0 and the actual data value, normally held in the g bit field, is contained in the assigned d bit field. Thus, there are three cases: 1) The data is owned. In this case, the check field code is GONE, the g bit field contains a 1, and the tag field contains an indicator of the processor that owns the data; 2) The data is unowned, and the data contained in the check field portion of the memory line does not match the GONE code for identifying owned data. In this case the memory line contains the data; and 3) The data is contained in the memory line, and the data held in the check field portion of the memory line matches the GONE code. In this case, the g bit field holds a 0 and the d bit field holds the true value of the G bit.

As can be seen, only in the rare third case is a second memory access required to obtain the requisite data. For any memory line, the GONE code may be any value but is preferably the result of a hashing function of the address of the memory line.

The memory controller comprises a data buffer, an address buffer, and a memory sequencer. The data buffer receives data signals and outputs data signals for the memory device. Similarly, the address buffer receives address signals for the memory device. The memory sequencer is a state machine that receives control signals, compares data received by the data buffer to data stored in the data storage, and generates signals to control the operation of the memory device.

The present invention includes a method for implementing cache tags for multi-processor computer systems. The method includes the steps of reading a memory line; determining if the data contained in a check field portion of the memory line matches a GONE code generated from the address of the memory line; if the GONE code and data do not match, reading the data as data; if the GONE code and data match, checking a G bit; if the G bit is 1, outputting the address of the processor that holds the data in its cache; and if the G bit is 0, reconstructing the data from a D bit and outputting the data as data.

DETAILED DESCRIPTION OF THE PREFERRED EMBODIMENTS

Figure 2:
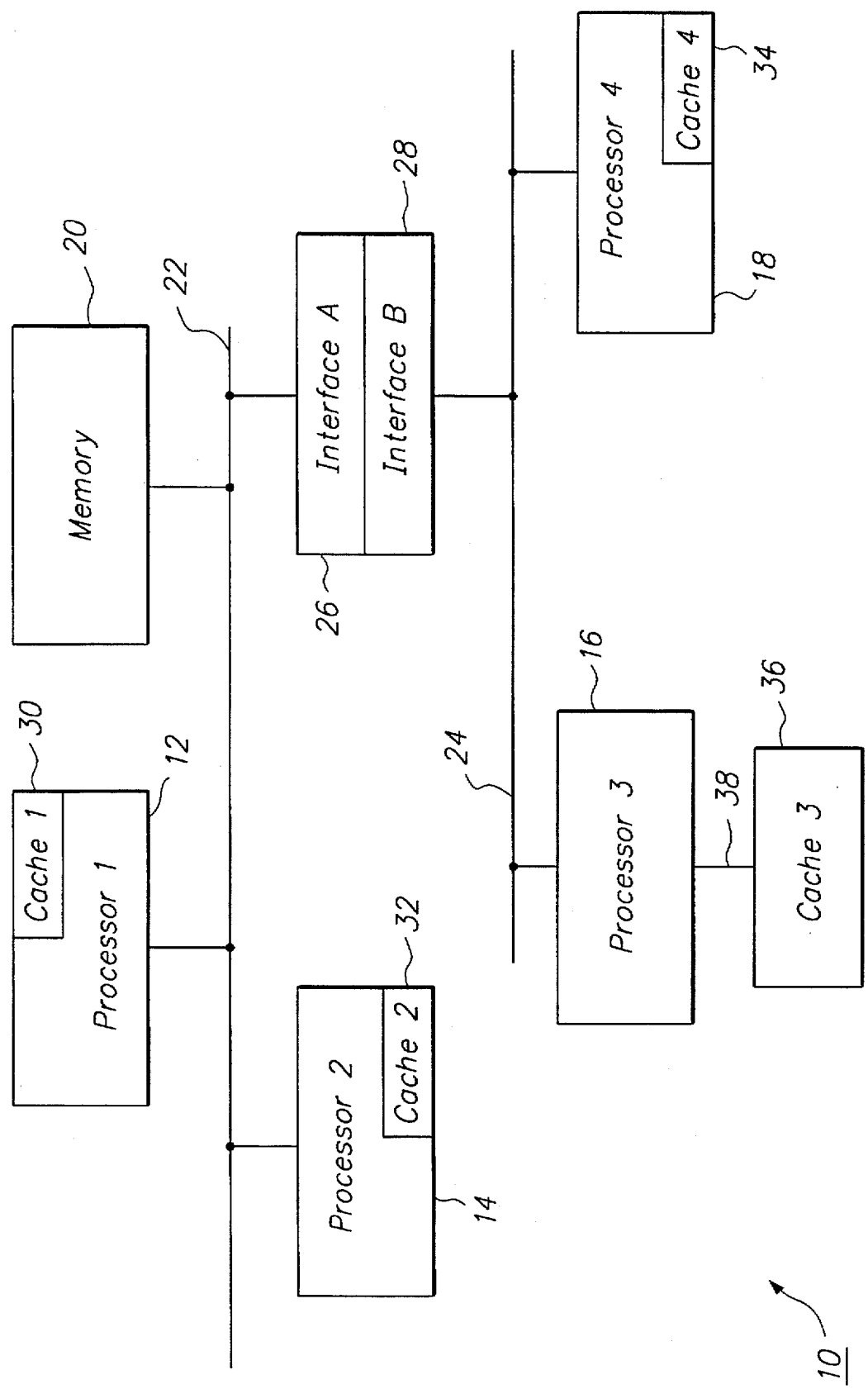
FIG. 2 is a block diagram of an exemplary multi-processor, multi-bus computer system.

Referring now to FIG. 2, a block diagram of a computer system 10 is shown. While the system 10 will now be described with reference to 4 processors, those skilled in the art will realize that the present invention applies to any system having a plurality of processors. The computer system 10 comprises a first processor 12, a second processor 14, a third processor 16, a fourth processor 18, and a memory 20. The first processor 12, second processor 14, and memory 20 are coupled by a first bus 22, and the third processor 16 and fourth processor 18 are coupled by a second bus 24. The first bus 22 and the second bus 24 are coupled by an A interface 26 and a B interface 28. The A interface 26 is coupled to the first bus 22, and the B interface 28 is coupled to the second bus 24.

In an exemplary embodiment, the processors 12, 14, 16, 18 are Power PC processors from Motorola Corporation of Schaumberg, Ill. The processors 12, 14, 16, 18 may alternately be Alpha Processors from the Digital Equipment Corporation of Maynard, Mass. or any other microprocessor capable of being used in a multi-processor computer system. The first processor 12, second processor 14, and fourth processor 18 each has an integrated cache 30, 32, and 34, respectively. An integrated cache 30, 32, 34 is a group of memory cells that are integrated into the same circuit or chip as the processor 12, 14, and 18. The third processor 16 has an off chip cache 36. The off chip cache 36 is integrated in a separate circuit and is coupled to the third processor 16 by a line 38. Each cache 30, 32, 34, 36 holds data for its processor 12, 14, 16, 18. Each processor 12, 14, 16, 18 can generally access data in its cache 30, 32, 34, 36 faster than it can access data in the memory 20. Furthermore, by accessing data in its cache 30, 32, 34, 36, a processor 12, 14, 16, 18 does not utilize the bus 22, 24. Thus, leaving the bus 22, 24 free for use by other devices.

The memory 20 comprises random access memory ("RAM"). The memory 20 holds data and program instruction steps for the processors 12, 14, 16, 18. The memory 20 will be described in greater detail with reference to FIGS. 2, 3, 4, and 5.

The A interface 26 and B interface 28 are conventional interfaces such as IEEE Std 1596 Scalable Coherent Interfaces. The A interface 26 and B interface 28 do not transmit memory access commands for which they are not in the transfer path. For example, the A interface 26 and B interface 28 would transfer memory access commands from the third processor 16 or the fourth processor 18 to the memory 20 since the path between processors 16 and 18 and memory 20 is through the interfaces 26, 28. The interfaces 26, 28, however, would not transmit memory access commands from the first processor 12 or second processor 14 since the interfaces 26, 28 are not in the path between these processors 12, 14 and the memory 20. Thus, the third processor 16 and fourth processor 18 cannot eavesdrop on accesses of the memory 20 by the first processor 12 or the second processor 14.

Figure 3:
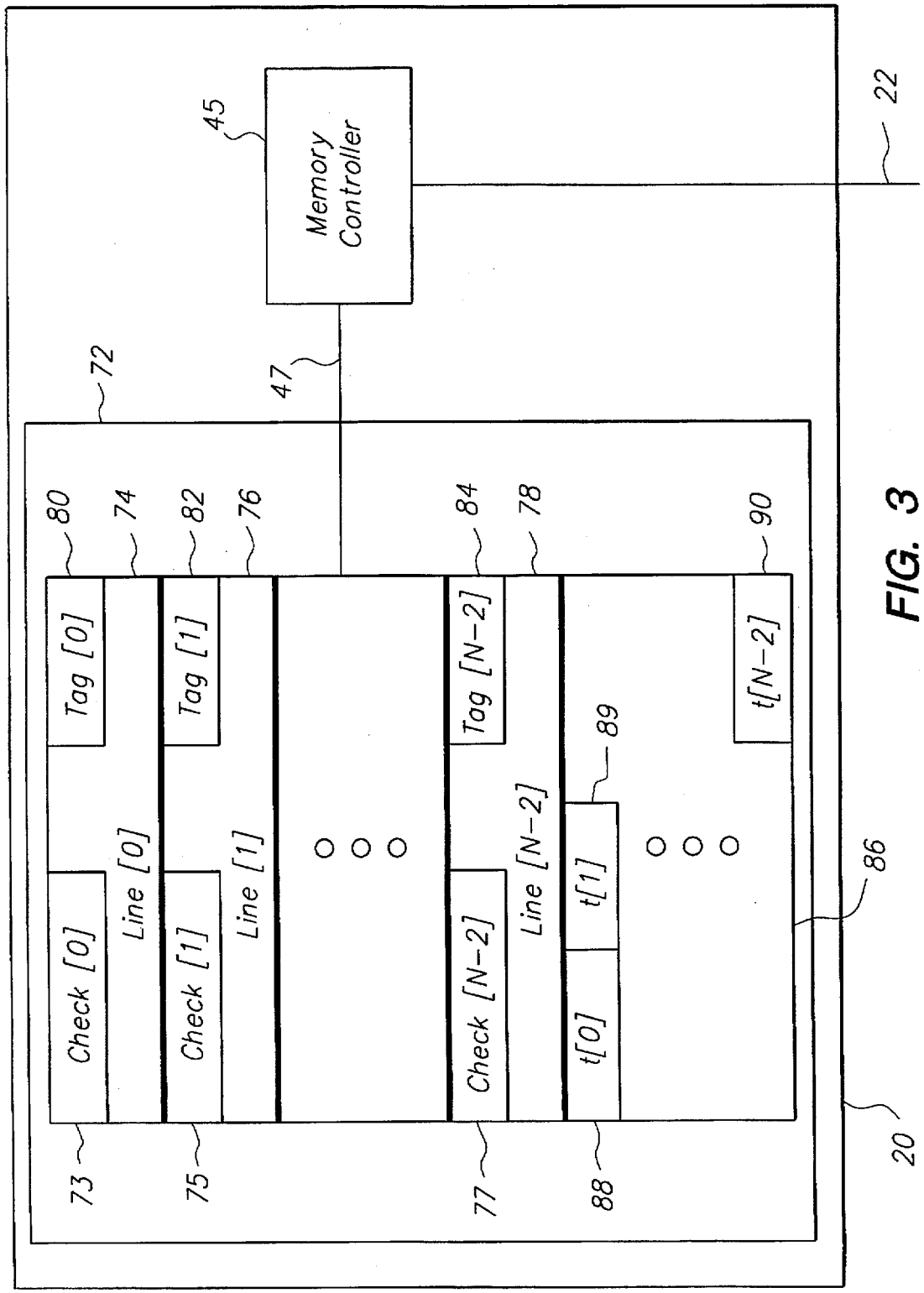
FIG. 3 is a block diagram of a memory constructed according to the present invention.

Referring now to FIG. 3, a block diagram of a first embodiment of the memory 20 constructed in accordance with the present invention is shown. The memory 20, shown in FIG. 3, comprises a data storage 72 and a memory controller 45. The data storage 72 comprises a plurality of memory lines. As before, each memory line 74, 76, 78 has an address. A memory line 74 has address 0; a memory line 76 has address 1; and a memory line 78 has address N-2. N is the number of memory lines in data storage 72. Each memory line 74, 76, 78 may hold data or check and tag codes. Tags codes are contained in a tag field of a first word of each memory line 74, 76, 78, and check codes are held in a check field of the first word of each memory line 74, 76, 78. When the data of a memory line is owned (cached and possibly modified), the check field contains a GONE code value and the tag field holds a tag field code. The tag field code is an encoded identifier of the owning processor 12, 14, 16, 18. Memory line 74 has a check field 73 and tag field 80. Similarly, memory lines 76 and 78 have check fields 75 and 77, respectively as well as tag fields 82 and 84, respectively. This first embodiment advantageously uses any portion of data storage 72 for the t bit storage 86. The t bit storage 86 comprises a plurality of t bit fields. Each t bit field of the t bit storage 86 is assigned to a memory line 74, 76, or 78. For example, a first t bit field 88 is assigned to memory line 74, a second t bit field 89 is assigned to memory line 76, and a t bit field 90 is assigned to memory line 78. A t bit field 88, 89, 90 is preferably 1 bit wide, and holds a T bit that confirms whether a memory line 74, 76, 78 holds data or a tag.

The memory controller 45 controls the operation of the first embodiment of the memory 20 and is coupled to the data storage 72 by a line 47. The memory controller 45 contains combinational logic circuits and data storage device. If the memory controller 45 receives a ReadOwned signal for the first memory line 74, the memory controller 45 first asserts a signal on the line 47 for the data storage 72 to transfer the contents of check field 73 to the memory controller 45. If the check field contains a GONE code, the memory controller 45 signals the data storage to transfer the T bit, held in t bit field 88, to the memory controller 45. For example if the check field 73 holds a GONE code and the T bit is a 1, then the data is owned; otherwise the data is unowned. If the data is owned, the memory controller 45 outputs the code contained in the tag field 80, onto the bus 22 along with a signal that the data is owned. If the data is not owned, the memory controller 45 outputs the contents of the first memory line 74 onto the bus 22.

Figure 1:
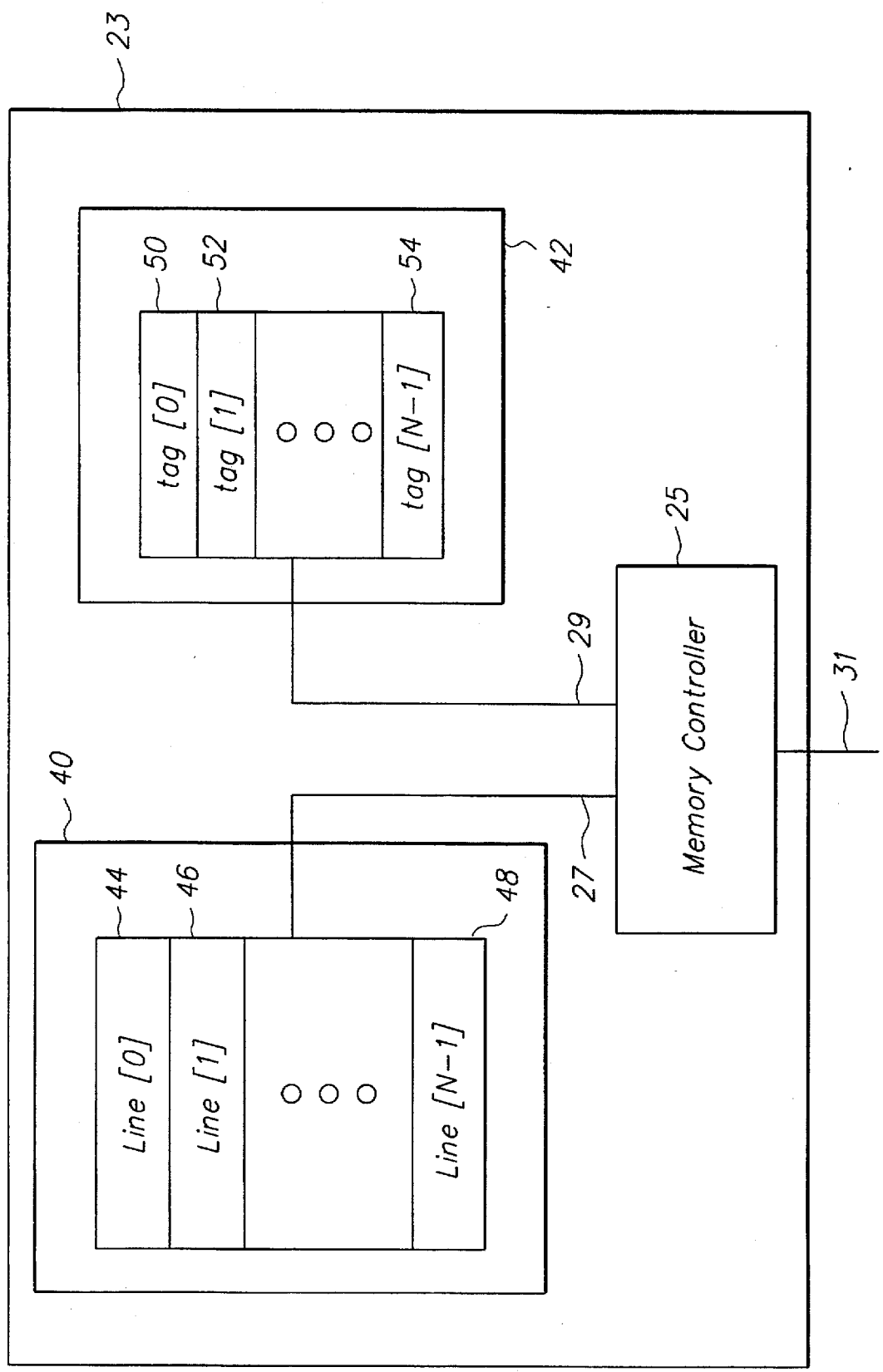
FIG. 1 is a block diagram of a prior art system of a main memory and a memory for storing memory tags that identify processors holding data.

This first embodiment of the present invention eliminates the need for a seperate tag memory 42 (shown in FIG. 1) and the accompanying problems of controller design. Although unowned data can be quickly returned and special tag storage is not required, two operations must still be executed whenever a memory line 74, 76, 78 is accessed. In this first embodiment, the t bit storage 86 is much smaller than the tag storage 42.

Figure 4:
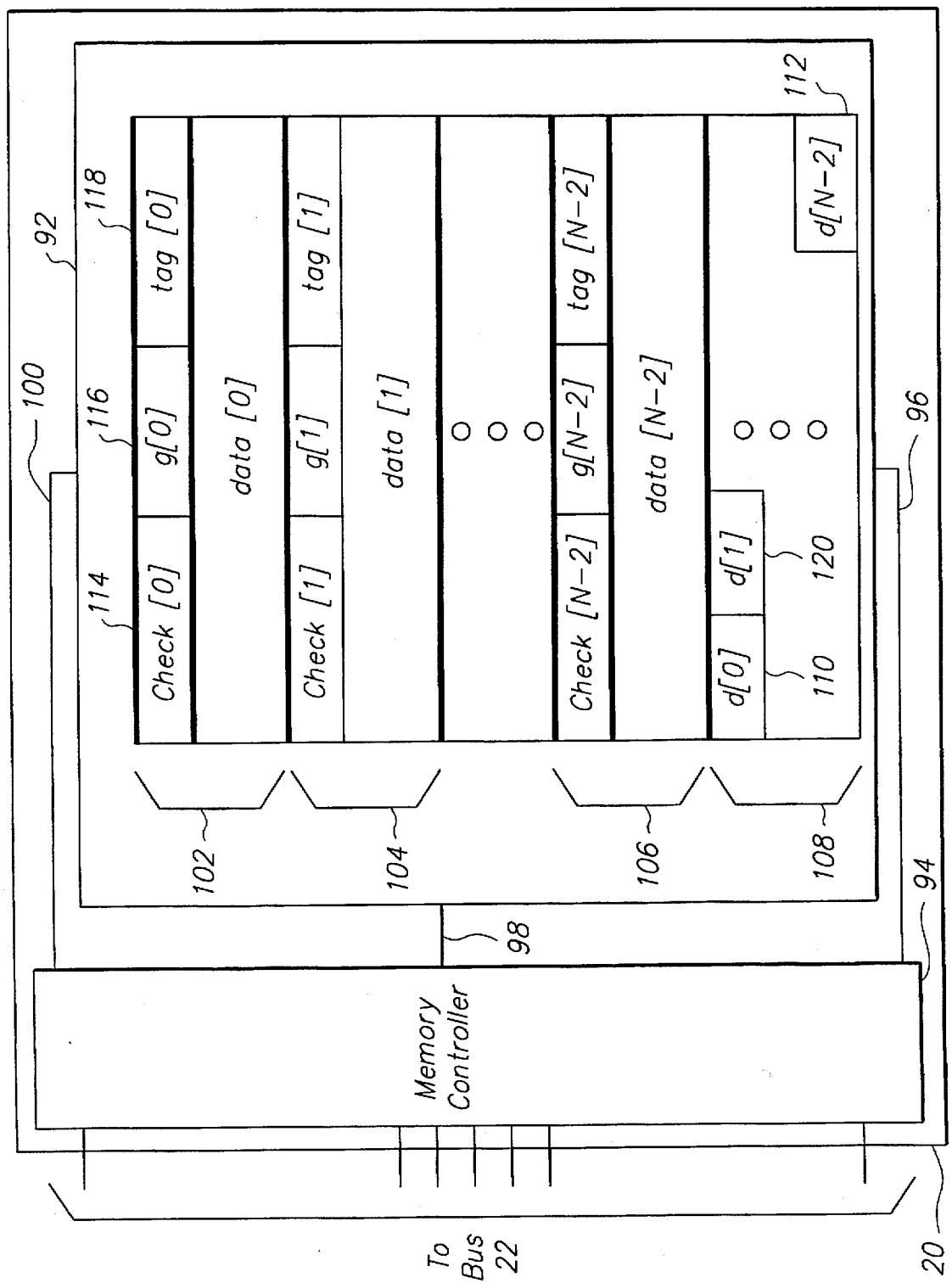
FIG. 4 is a block diagram of a second embodiment of a memory constructed according to the present invention.

Referring now to FIG. 4, a second embodiment of the memory 20, constructed according to the present invention, is shown. The memory 20 comprises a data storage 92 and a memory controller 94. The memory controller 94 is coupled to the bus 22 to receive data, address, and control signals and is coupled to the data storage 92 by a first line 96 for address signals, a second line 98 for control signals, and a third line 100 for data signals. Alternately, the memory controller 94 may be coupled to the data storage 92 by a single line. In this alternate embodiment, the single line would be used sequentially for data, address, and control signals. The memory controller 94 interprets incoming signals, determines if data contained in the data storage 92 is fresh or is owned by another processor 12, 14, 16, or 18, and generates and outputs data, address, and control signals on the bus 22.

The data storage 92 comprises a plurality of memory lines. Each memory line has an address. Memory line 102 has address 0; memory line 104 has address 1; and memory line 108 has address N-2. N is the number of memory lines in the data storage 92. Each memory line 102, 104, 106 comprises one or more words, all memory lines 102, 104, 106, however, have the same number of words. Whenever an address is accessed, all words of the memory line 102, 104, 106 at the address are accessed. For example, if the first memory line 102 is being read, all words of the memory line 102 are output by the memory 20. While the words may have any number bits, currently and preferably each word comprises 64 bits. A portion of the data storage 92 is used for storing D bits. FIG. 4 shows a final portion 108 of the data storage 92 being used for holding D bits. Any portion of the data storage 92 may be dedicated to contain D bits. Each D bit is one bit in length and is contained in a d bit field. The d bit fields are arranged according to the memory lines 102, 104, 106 to which they are assigned. For example, a d bit field 110 is assigned to memory line 102; a d bit field 120 is assigned to memory line 104; and a d bit field is assigned to memory line 106. Each memory line between memory line 104 and memory line 106 also has an assigned d bit field. The D bits will be explained in greater detail below.

According to the present invention, a first word of each memory line has 3 fields. As can be seen with reference to the first memory line 102 of FIG. 4, the first word has a check field 114, a g bit field 116, and a tag field 118. The check field 114, g bit field 116, and tag field 118 are used in two different ways. First, if the first memory line 102 is not owned, then the check field 114, g bit field, and tag field 118 of the first word are used to contain data. Second, if the memory line 102 is owned, the first word is used to contain the tag. The g bit field 116 is at least one bit in length, and the bits of the check field 114, g bit field 116, and tag field 116 total 64 in the exemplary embodiment that will be described. In the exemplary embodiment, the check field 114 is 32 bits in length, and the tag field 118 is 31 bits in length. In other applications, the lengths may be different. When owned, the check field 114 contains a GONE code that indicates that the data held in memory line 102 is owned by a processor 12, 14, 16, 18. The GONE code value is preferably generated by the memory controller 94. If the GONE code is not contained in the check field 114, then the memory line 102 contains unowned data, and the contents of the check field 114, g bit field 116, and tag field 118 are a part of the data. There is a rare case where the check field 114 holds unowned data that happens by chance to match the GONE code. If the data is owned by a processor 12, 14, 16, 18, then the tag field 118 holds a coded identification of the owning processor 12, 14, 16, 18, a tag. The g bit field 116 is required for the rare situations where unowned data contained in the first memory line 102 matches the GONE code that is normally contained in the check field 114 and used to indicate that the data is owned by a processor 12, 14, 16, 18. When data is owned by a processor 12, 14, 16, 18, the check field 114 holds the GONE code indicating ownership, and the g bit field 116 contains a 1. If the data is not owned but the data held in the check field 114 matches the GONE code used to indicate that the data is owned, the g bit field 116 contains a 0. In this case, the g bit field 114 contains a 0 regardless of whether the actual data is a 1 or a 0, and the d bit field 110 is set to hold the actual data value of the G bit. Thus for most memory accesses, the present invention requires only one read function. Only when the data in the check field 114 matches the GONE code used to indicate ownership and the g bit field 116 holds a 0, must there be a second read function to determine the true data value of the G bit. In this case the true data value of the G bit is obtained from the assigned D bit.

The GONE code contained in the check field 114 and used to indicate that the data is owned may be any code value. Preferably, the GONE code is the result of a hashing function where the input to the hashing function is the address of the first memory line 102. For example, when using a 32-bit address, a 32-bit hashing function may be an exclusive-or of the address and the bit-reversed version of the address. Alternately, when using a 64 bit address, a 32-bit hashing function may be an exclusive-or of the even bits and the bit-reversed odd bits. There are many other hashing functions that may be employed with the present invention, and those skilled in the art will recognize these functions.

The present invention advantageously eliminates the need to eavesdrop on memory accesses by other processors 12, 14, 16, 18. Whenever a processor 12, 14, 16, 18 accesses a memory address, the processor 12, 14, 16, 18 either receives valid data or receives the identity of the processor 12, 14, 16, 18 that owns the valid data. The present invention does this without having to modify the size or shape of the memory 20 or bus 22. The present invention is particularly advantageous because the unique field system of check fields, G bit fields, and tag fields greatly improves the performance of the memory controller. While the prior art required two memory controller accesses of the data storage to provide the data and even more for outputting the tag, the present invention is able to provide the data or the tag in a majority of instances with only a single access of the data storage. Furthermore, the second embodiment shown in FIG. 4 is an improvement over the first embodiment shown in FIG. 3. The first embodiment requires a second access of the data storage 72 whenever the data held in the check field 73, 75, 77 matches the GONE code. By contrast, the second embodiment requires a second access in the rare instances when the data is unowned and matches the GONE code; that is the data held happens by chance to match the GONE code for the memory line 102, 104, 106. This eliminates some of the second accesses required by the first embodiment.

Figure 5:
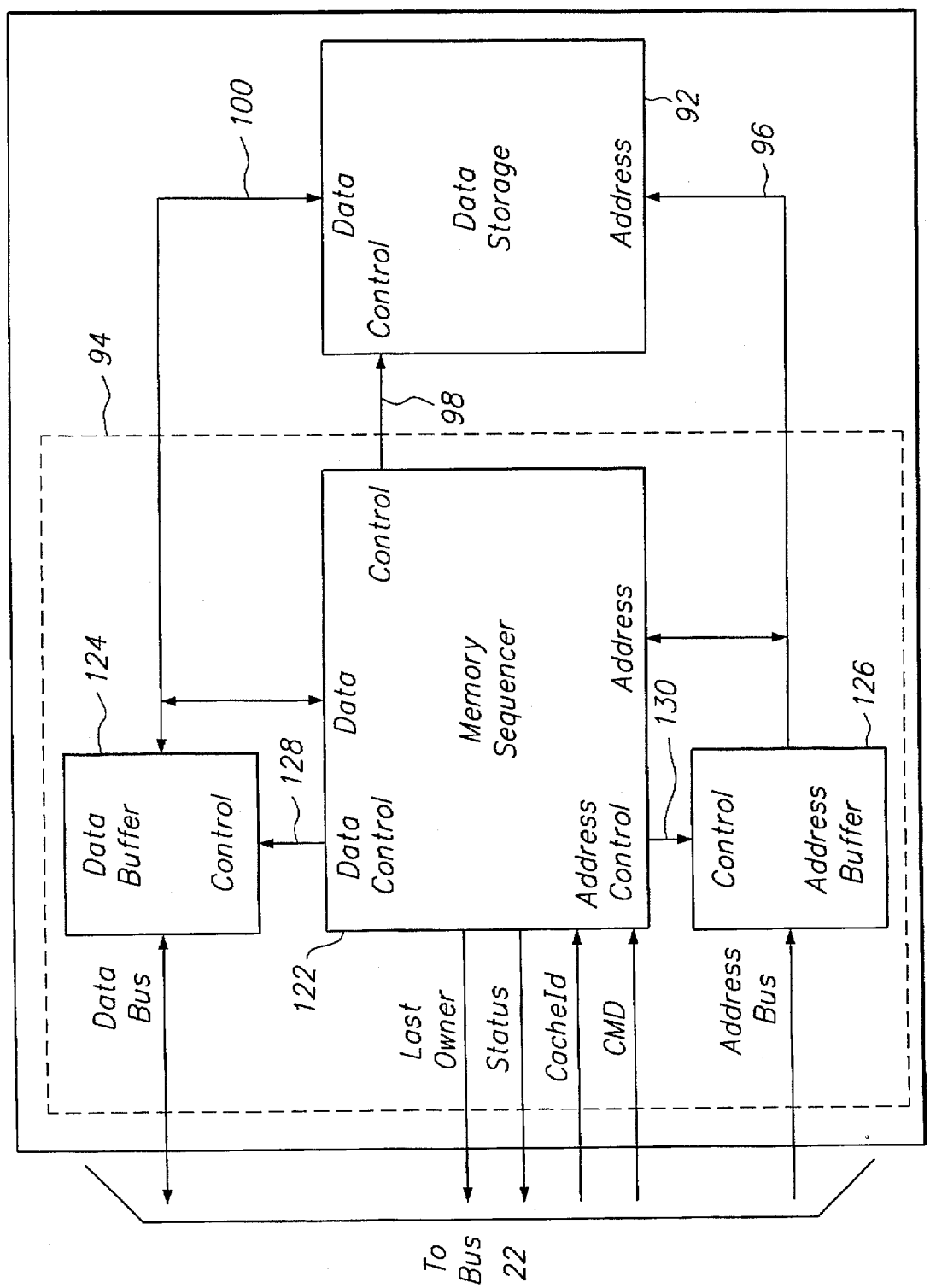
FIG. 5 is a block diagram of the second embodiment of the memory and associated control circuitry constructed according to the present invention.

Referring now to FIG. 5, a block diagram of the second embodiment of the memory 20, with the memory controller 94 in detail, is shown. The memory controller 94 comprises a memory sequencer 122, a data buffer 124, and an address buffer 126. The memory controller 94 may include other elements of conventional memories such as systems for refreshing the memory; these conventional elements may alternatively be in another structure. The data buffer 124 is a conventional buffer for receiving digital data. The data buffer 124 has a first input/output and a second input/output, and a control input. The first input/output and the second input/output are bi-directional, that is they may either receive or transmit digital data. The first input/output is coupled to the data bus of the bus 22 to receive and transmit data signals. The second input/output of the data buffer 124 is coupled to the data storage 92 by line 100. Similarly, the address buffer 126 is a conventional buffer for storing addresses. The address buffer 126 has an input, which is coupled to the address bus of the bus 22, for receiving addresses, a control input, and an output. The output of the address buffer 126 is coupled to the data storage 92 by line 96.

The memory sequencer 122 is a state machine that receives signals and generates signals for controlling accesses to the data storage 92. The memory sequencer 122 comprises combinational logic and data storage devices to implement its functions. Those skilled in the art will realize how to construct a memory sequencer 122 from the inputs, outputs, and states that are described below. The memory sequencer 122 has a first input/output, coupled to the address buffer 126 and to the data storage 92 by line 96, for receiving and transmitting addresses. A second input/output is coupled to the data buffer 124 and to the data storage 92 by line 100. The memory sequencer 122 receives and outputs data signals through the second input/output. The memory sequencer 122 has a first output for transmitting control signals to the data storage 92. The first output is coupled to the data storage by line 98. The memory sequencer 122 transmits data control signals to the data buffer 124 through a second output. The second output is coupled to the data buffer 124 by a line 128. A third output of the memory sequencer 122 transmits address buffer control signals and is coupled to the address buffer 126 by a line 130. The memory sequencer 122 outputs signals indicating the identity of a processor 12, 14, 16, 18 that owns data that another processor 12, 14, 16, 18 is attempting to access onto the control bus of the bus 22 through a fourth output. The fourth output is coupled to the control bus of the bus 22 and is labeled "Last Owner." Often when a processor 12, 14, 16, 18 attempts to access memory line 102, that processor 12, 14, 16, 18 becomes the new owning processor 12, 14, 16, 18 that is identified in the tag field 118. If another processor 12, 14, 16, 18 already owns the data, the accessing processor 12, 14, 16, 18 will request the data from the prior owner. Thus, the accessing processor 12, 14, 16, 18 becomes the new owner. For this reason, the fourth output of the memory sequencer 122 is labeled "Last Owner." The memory sequencer 122 has a fifth output that is coupled to the control bus of the bus 22. The memory sequencer 122 outputs a Status signal, which indicates the success of the memory access, through the fifth output. If another processor 12, 14, 16, 18 owns the data, the memory sequencer 122 generates and outputs, through the fifth output, a DIFF Status signal. If the data is unowned, the memory sequencer 122 generates and outputs, through the fifth output, a NONE Status signal. The memory sequencer 122 generates and outputs a SAME Status signal in certain situations. The memory sequencer 122 would generate the SAME Status signal if the accessing processor 12, 14, 16, 18 is the processor identified in the tag field 118 as the owning processor 12, 14, 16, 18.

The memory sequencer 122 has a first input, which is coupled to the control bus of the bus 22, through which the memory sequencer 122 receives the identity of the processor 12, 14, 16, 18 which is attempting a memory access, and the memory sequencer 122 has a second input, also coupled to the control bus of the bus 22, through which the memory sequencer 122 receives the command of the processor 12, 14, 16, 18. The first input is labeled CacheId, and the second input is labeled CMD.

The two basic commands are ReadOwned and WriteReturn. The ReadOwned command is used when the accessing processor 12, 14, 16, 18 is to become the owning processor 12, 14, 16, 18 on the completion of the command. The WriteReturn command is used when the accessing processor 12, 14, 16, 18 is to write data that becomes unowned. If a processor 12, 14, 16, 18 attempts a ReadOwned command on data that another processor 12, 14, 16, 18 owns, the accessing processor 12, 14, 16, 18 becomes the owning processor 12, 14, 16, 18 and a DIFF Status signal is generated. The accessing processor 12, 14, 16, 18 then requests the data from the last owning processor 12, 14, 16, 18. If a processor 12, 14, 16, 18 attempts a ReadOwned on unowned data, a NONE Status signal is generated, the data is returned to the accessing processor 12, 14, 16, 18, and the accessing processor 12, 14, 16, 18 becomes the owner of the data. If a processor 12, 14, 16, 18 attempts a ReadOwned command on data it owns, a SAME Status signal results and no data is returned. This is usually an error condition. When a WriteReturn command is issued on data that is owned by the accessing processor 12, 14, 16, 18, the data, from the accessing processor 12, 14, 16, 18, is written at the memory location, a SAME Status signal is generated, and the data becomes unowned. When a WriteReturn command is issued on data owned by a processor 12, 14, 16, 18 other than the accessing processor 12, 14, 16, 18, a DIFF Status signal is generated, and neither ownership nor the data held in the memory 20 is modified. Finally, when a WriteReturn command is issued on unowned data, a NONE Status signal is generated, and the data is not modified. This last situation is usually an error situation. There are two additional commands that are closely related to the ReadOwned and WriteReturn commands. These commands are ReadFresh and WriteCheck. The ReadFresh command is used when unowned data is to be read and is to remain unowned when the command is completed. The ReadFresh command is similar to the ReadOwned command, but when the ReadFresh command is executed on unowned data, the data remains unowned. The WriteCheck command is used to update unowned data and that data is to remain unowned. If the WriteCheck command is issued on data owned by a processor 12, 14, 16, 18 other than the accessing processor, a DIFF Status signal is generated, the data is modified, and ownership changes to the accessing processor 12, 14, 16, 18. If a WriteCheck command is issued on unowned data, the data in the memory line is modified, a NONE Status signal is generated, and the data in the memory line remains unowned. Finally, if the WriteCheck command is issued on data owned by the accessing processor 12, 14, 16, 18, a SAME Status signal is generated; this is usually an error situation. There are other possible commands. From the commands described here, those skilled in the art will recognize these commands.

Figure 6:
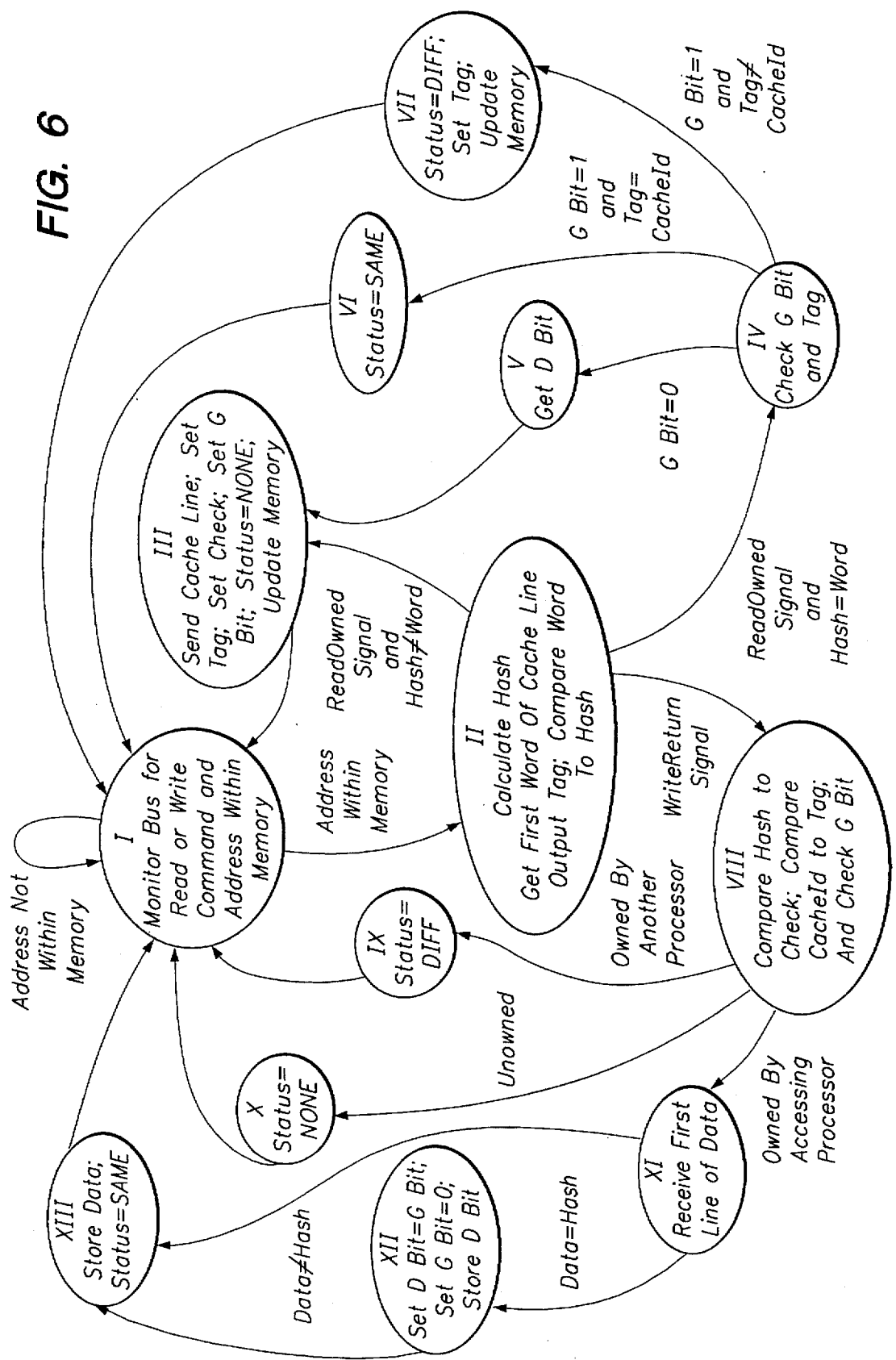
FIG. 6 is a state diagram of the states of a memory sequencer of the present invention.

Referring now to FIG. 6, a state diagram for an exemplary embodiment of the memory sequencer 122 is shown. FIG. 6 shows the significant states of the memory sequencer 122; other states may be necessary to implement fully the memory sequencer 122. These additional states will be understood by those skilled in the art. FIG. 6 shows the significant states for the ReadOwned and WriteReturn commands. Those skilled in the art will recognize the states necessary for other commands. The memory sequencer 122 receives command signals through its CMD input, address data through the input to the address buffer 126, and a CacheId signal through its CacheId input. The CacheId signal identifies the accessing processor 12, 14, 16, 18. When the memory sequencer 122 receives a ReadOwned, WriteReturn, or other appropriate command signal, the memory sequencer 122 generates a signal and asserts the signal on line 130 for the address buffer 126 to capture the address and to transfer the address to the memory sequencer 122. The address buffer 126 transfers the address by asserting a signal on line 96, which is coupled to the address input/output of the memory sequencer 122. The memory sequencer 122 then analyzes the address to determine if the address is for a location within the data storage 92. As shown in FIG. 2, the computer system 10 has only one memory 20. Computer systems may, however, have multiple memories. Where a computer system has multiple memories, the memory sequencer 122 must determine if the address is within its data storage 92. If the address is not for an address within its data storage 92, the memory sequencer 122 remains in state I.

If the address is for a location within the data storage 92, the memory sequencer 122 enters state II. For this explanation, it will be assumed that the received address is 0, and the memory line to be accessed is the first memory line 102. Those skilled in the art will realize how the description applies to all memory lines of the data storage 92. In state II, the memory sequencer 122 generates the GONE code for the address 0. As described above with reference to FIG. 5, the memory sequencer 122 preferably uses a hashing function to generate the GONE code for the address. The memory sequencer 122 then generates a signal instructing the data storage 92 to output the first word of the first memory line 102 at the address to the memory sequencer 122. The memory sequencer 122 transmits the signal to this data storage 92 on line 98, and in response, the data storage 92 transmits the first word to the memory sequencer 122 on line 100. The memory sequencer 122 outputs the data contained in the tag field 118 of the first word, through its Last Owner output, onto the control bus of the bus 22. Note that the memory sequencer 122 has not yet determined if memory line 102 is owned by a processor 12, 14, 16, 18. If the first memory line 102 is not owned, the tag that has been output is meaningless and will be ignored. If the first memory line 102 is owned, the data in the tag field 118 identifies the owning processor and will be used by the accessing processor 12, 14, 16, 18. Once the memory sequencer 122 has output the data from the tag field 118 through the Last Owner output, it compares the data in the check field 114 to the GONE code that it just generated. The memory sequencer 122 then transitions out of state II.

If the memory sequencer 122 received a ReadOwned command at its CMD input and the GONE code does not match the data contained in the check field 114, the memory sequencer 122 transitions from state II to state III. In this case, the first memory line 102 is not owned by any processor 12, 14, 15, 18, since the GONE code is not equal to the data held in the check field 114. In state III, the memory sequencer 122 asserts a signal on line 98 instructing the data storage 92 to output the contents of the first memory line 102 onto line 100. The memory sequencer 122 then asserts a signal on line 128 for the data buffer 124 to receive the data and to output the data onto the data bus of the bus 22. This is done for each word until the entire contents of memory line 102 have been transferred to the bus 22. The first memory line 102 is now owned by the accessing processor 12, 14, 16, 18. The memory sequencer 122 signals the data storage 92 to store the GONE code, which the memory sequencer 122 determined in state II, in the check field 114, to set the G bit in the g bit field 116 to 1, and to store the identity of the accessing processor 12, 14, 16, 18 in the tag field 118. The memory sequencer 122 received the identity of the accessing processor 12, 14, 16, 18 through its CacheId input. Finally, the memory sequencer 122 generates a NONE Status signal and asserts this signal onto the control bus through the Status output. The memory sequencer 122 then leaves state III and returns to state I.

If in state II, the memory sequencer 122 determines that the GONE code matches the data held in the check field 114 and the memory sequencer 122 received a ReadOwned signal, the memory sequencer 122 enters state IV. The first memory line 102 may be owned by a processor 12, 14, 16, 18; it is also possible that the data contained in check field 114 simply matches the GONE code. In state IV, the memory sequencer 122 gets the G bit from the g bit field 116. The memory sequencer 122 has already obtained the first word from the data storage 92 in state II. If the G bit is 0, the first memory line 102 is unowned and the memory sequencer 122 proceeds to state V. In state V, the memory sequencer 122 signals the data storage 92 to transfer the value of the D bit for the first memory line 102, which is held in the d bit field 110, to the memory sequencer 122. The memory sequencer 122 then sets the value contained in the g bit field 116 equal to the value of the D bit and proceeds to state III. This is the very rare occurrence where the present invention must make two reads to accomplished the memory access. This only occurs when the data held in a memory line is unowned, and the data held in the check field happens by chance to match the GONE code.

If in state IV, the G bit, contained in the g bit field 116, is equal to 1, the memory sequencer 122 checks the tag held in the tag field 118. If the tag matches the CacheId received at the CacheId input, the memory sequencer 122 moves to state VI. In this case, the first memory line 102 is owned by the accessing processor 12, 14, 16, 18. The data held in the first memory line 102 may not be read since it is owned. In state VI, the memory sequencer 122 generates a SAME Status signal and asserts the signal on the control bus through the Status output. A SAME Status signal indicates that a memory line is owned by the accessing processor 12, 14, 16, 18 and usually indicates an error condition. The memory sequencer 122 then returns to state I.

If in state IV the G bit is 1 and the tag does not match the CacheId received at the CacheId input, the memory sequencer 122 enters state VII. As in State VI, the data in the first memory line 104 of the data storage 92 is not valid data. The memory sequencer 122 generates and outputs a DIFF Status signal. The DIFF Status signal indicates that the first memory line 104 is owned. The memory sequencer 122 already output the identity of the owning processor 12, 14, 16, 18 when it output the contents of the tag field 118 in state I. The accessing processor 12, 14, 16, 18 will receive the DIFF Status signal along with the contents of the tag field 118, and the accessing processor 12, 14, 16, 18 will then be able to obtain the valid data by requesting the data from the owning processor 12, 14, 16, 18. The memory sequencer 122 then signals the data storage 92 to store an identifier for the accessing processor 12, 14, 16, 18 in the tag field 118. The accessing processor 12, 14, 16, 18 now becomes the owner of the first memory line 102. The memory sequencer 122 then returns to state I.

In state II, if the memory sequencer 122 received a WriteReturn signal in state I, the memory sequencer 122 moves to state VIII. With the WriteReturn command, only an owning processor 12, 14, 16, 18 may write to a memory line. In state VIII, the memory sequencer 122 compares the GONE code determined in state II from the address to the code contained in the check field 114 and compares the CacheId signal received from the control bus to the tag held in the tag field 118. The memory sequencer 122 also determines if the G bit contained in the g bit field 116 is a 1. If the first memory line 102 is owned by another processor 12, 14, 16, 18, then the memory sequencer 122 moves to state IX. The first memory line 102 is owned by another processor 12, 14, 16, 18 if the code held in the check field 114 matches the GONE code that the memory sequencer 122 generated from the address in state II, if the G bit contained in the g bit field 114 is 1, and if the tag held in the tag field 118 does not match the CacheId signal received from the control bus. If any one of these three conditions is not met, then the first memory line 102 is not owned by another processor 12, 14, 16, 18 and the memory sequencer 122 does not enter state IX. In state IX, the memory sequencer 122 generates a DIFF Status signal and asserts this signal on the control bus of the bus 22. The memory sequencer 122 then returns to state I.

If, in state VIII, the first memory line 102 is unowned, the memory sequencer 122 moves to state X. An accessing processor may only write to a memory line owned by itself. The first memory line 102 is unowned if one of two conditions is met. The first condition is that the code, held in the check field 114, does not match the GONE code generated in state II. The second condition is that the code, held in the check field 114, matches the GONE code generated in state II, but the G Bit, held in the g bit field 116, is a 0. In state X, the memory sequencer 122 generates a NONE Status signal. As was explained above, this is usually an error condition. The memory sequencer 122 then returns to state I.

If, in state VIII, the first memory line 102 is owned by the accessing processor 12, 14, 16, 18, the memory sequencer 122 enters state XI. The first memory line 102 is owned by the accessing processor 12, 14, 16, 18 if three conditions are met. The first condition is the code held in the check field 114 matches the GONE code generated by the memory sequencer 122 from the address in state II. The second condition is the G bit, held in the g bit field 116, is a 1. The third condition is the CacheId signal, received from the control bus, matches the tag held in the tag field 118. If these three conditions are met, the memory sequencer 122 proceeds to state XI.

In state XI, the memory sequencer 122 generates a signal and asserts the signal on line 128 for the data buffer 124 to transfer the first word of the data to be written in the first memory line 102 to the memory sequencer 122. The memory sequencer 122 then compares the GONE code generated in state II to the data received from the data buffer 124. Note that in state VIII, the memory sequencer 122 compared the GONE code to the data contained in the check field 114. In state XI, however, the memory sequencer 122 is comparing the GONE code to the first 32 bits of the first word of the data that is entering the memory 20. The memory sequencer 122 is not comparing the GONE code to the data already held in the memory 20. When a processor 12, 14, 16, 18 writes data to the memory 20 the data becomes unowned. The memory sequencer 122 must, however, determine if the data, by chance, matches the GONE code. If the first 32 bits of the first word match the GONE code, the memory sequencer 122 moves to state XII. In state XII, the memory sequencer 122 sets the D bit to the value of the G bit of the first word and records this value in the d bit field 110. The memory sequencer 122 then assigns to the G bit the value of 0.

From state XII or, if the data did not match the GONE code, from state XI, the memory sequencer 122 enters state XIII. In state XIII, the memory sequencer 122 first generates a signal instructing the data storage 92 to store the incoming data in the first memory line 102. The first word is transmitted from the memory sequencer 122, the remainder is transmitted from the data buffer 124. The memory sequencer 122 then generates a SAME Status Signal. The SAME Status signal indicates to the accessing processor 12, 14, 16, 18 that the WriteReturn was successful. The memory sequencer 122 then returns to state I.

Figure 7A:
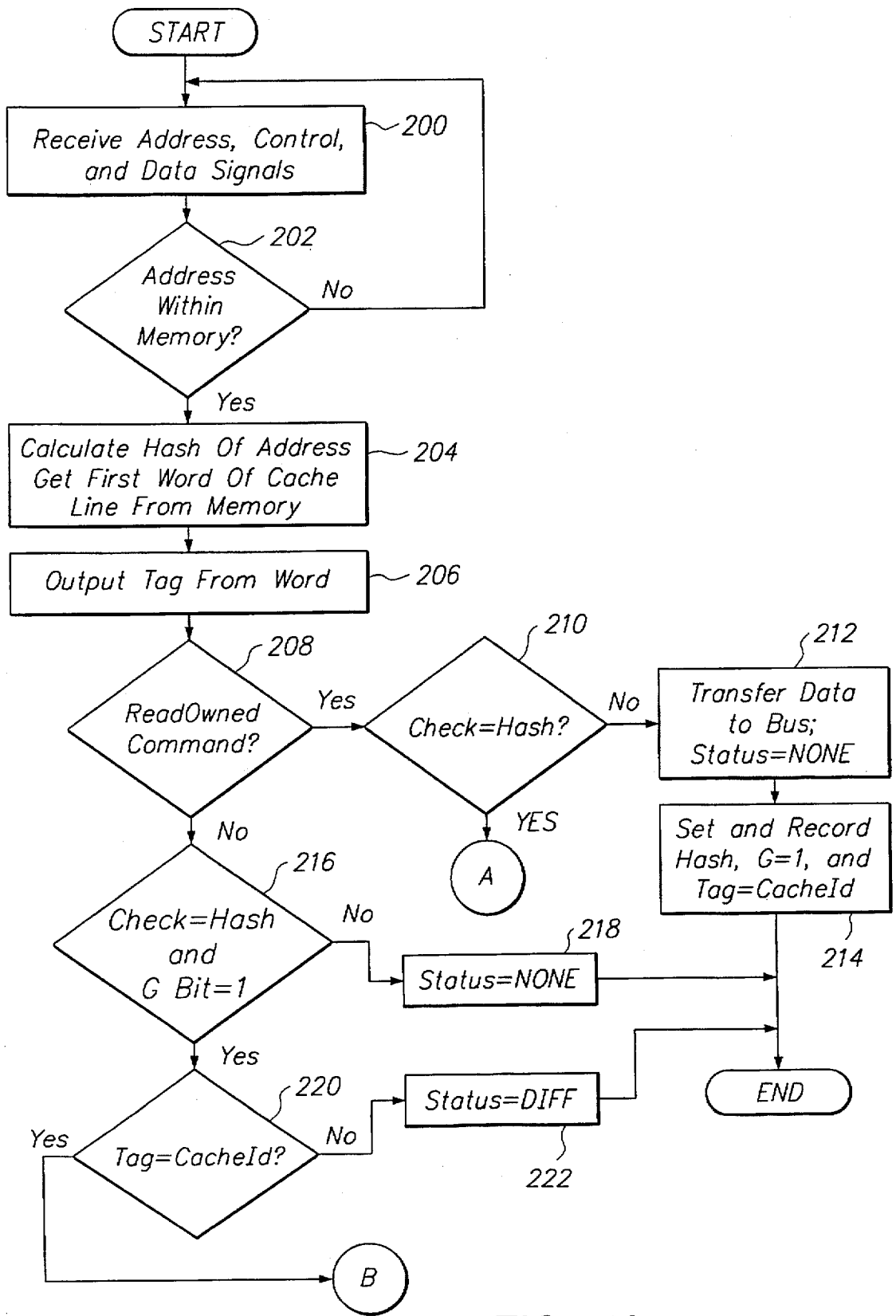
FIGS. 7A, 7B, and 7C are flow charts showing a method for accessing a memory device according to the present invention.
Figure 7B:
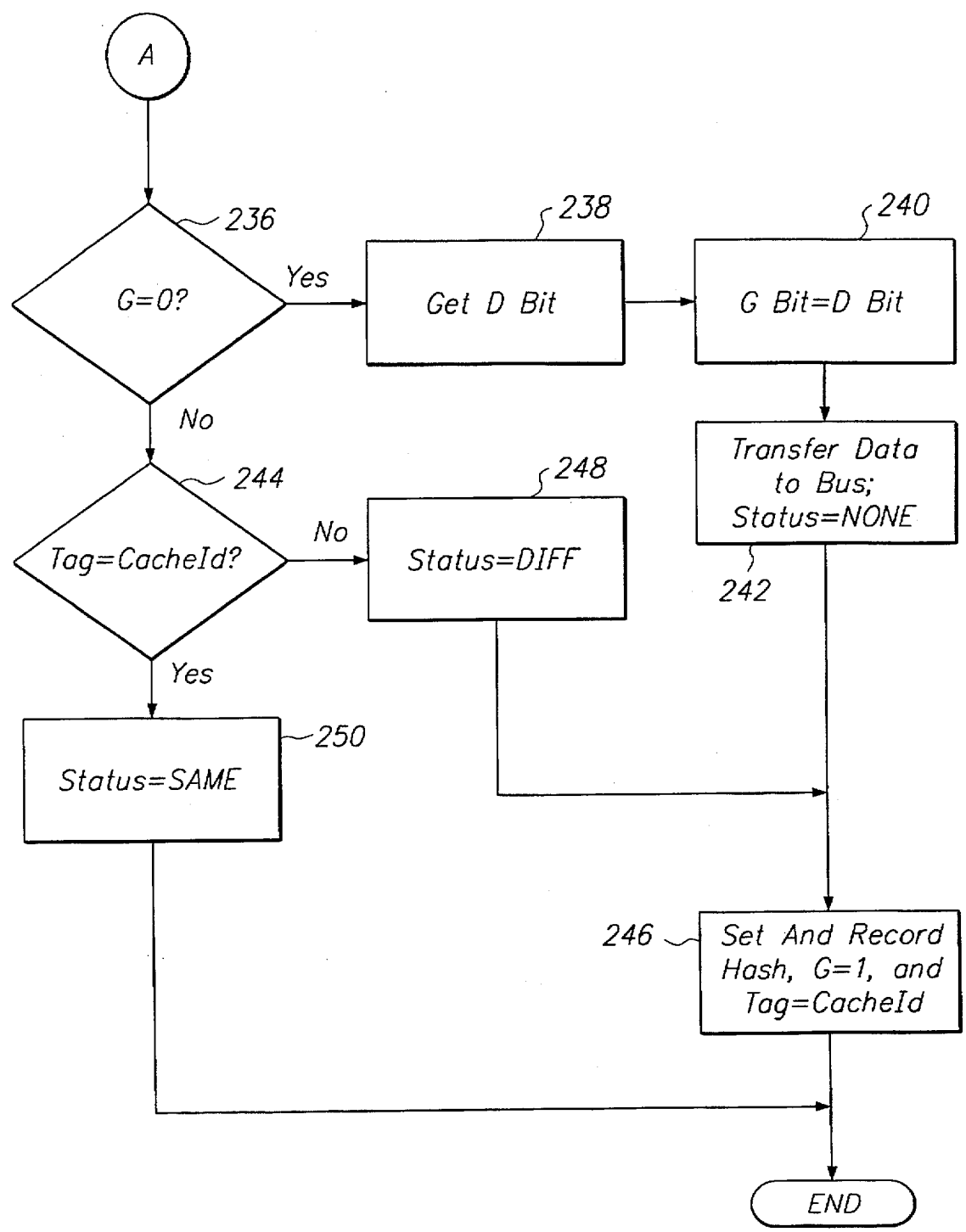
Figure 7C:
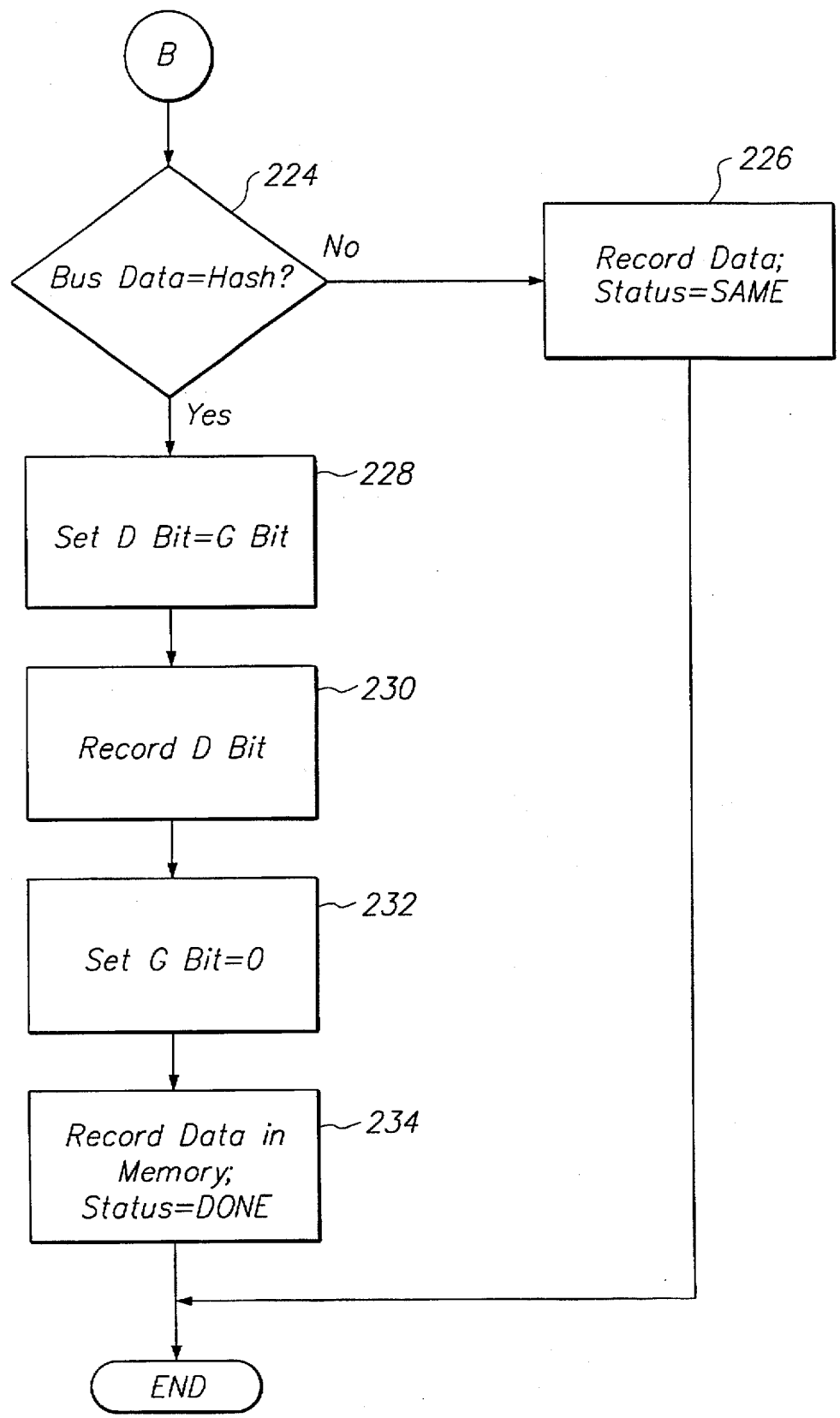

Referring now to FIGS. 7A, 7B, and 7C, flow charts of a method for accessing a memory utilizing the present invention are shown. The method begins in step 200 where a memory sequencer 122 receives address, control, and data signals. The memory sequencer 122 receives an address signal, a command signal, and a CacheId signal that identifies the accessing processor 12, 14, 16, 18. In step 202, the memory sequencer 122 determines if the address is within its associated data storage 92. If the address is not within the data storage 92, the method returns to step 200 to await another address. If the address is within the data storage 92, the method moves to step 204.

In step 204, the memory sequencer 122 determines a GONE code from the address. The memory sequencer 122 may use any method for generating the GONE code. The memory sequencer 122 preferably uses a hashing function to generate the GONE code. For example, if a 32 bit address is used, the memory sequencer 122 may use an exclusive-or of the address and the bit-reversed version of the address. Alternately, if a 64 bit address is used, the memory sequencer 122 may use an exclusive-or of the even bits of the address and the bit-reversed version of the odd bits. There are many other hashing functions that may be used; those skilled in the art will recognize these functions. Also in step 204, the memory sequencer 122 signals for and receives the first word of data contained in the addressed memory line. In this description it will be assumed that the address was 0 and the first memory line 102 is to be accessed. Those skilled in the art will recognize how the method applies to all memory lines of the data storage 92.

In step 206, the memory sequencer 122 outputs, through its Last Owner output, onto the control bus of the bus 22, data held in a tag field 118 of the first memory line 102. If the first memory line 102 is owned, then the tag identifies the owning processor 12, 14, 16, 18 to the accessing processor 12, 14, 16, 18. If the first memory line 102 is not owned, then the tag will be ignored. In step 208, the memory sequencer 122 determines if the control signal received through its CMD input is a ReadOwned command. The memory sequencer 122 ignores command signals on the bus 22 that do not affect the memory 20. For this description it will be assumed that there are only two memory operations, Read- Owned and WriteReturn. Those skilled in the art will realize how the method may be modified for other memory operations such as ReadFresh, WriteCheck, and others. If the command is a ReadOwned command, the method moves to step 210 where the memory sequencer 122 compares the GONE code, determined in step 204, to the data contained in the check field 114. If the GONE code does not match the data contained in the check field 114, the memory sequencer 122, in step 212, signals the data storage 92 and data buffer 124 to output the contents of the first memory line 102 onto the data bus of the bus 22. The memory sequencer 122 also generates and outputs, through its Status output, onto the control bus a NONE Status signal. In step 214, the memory sequencer 122 signals the data storage 92 to store the GONE code, generated in step 204, in the check field 114, a 1 in the g bit field 116, and the CacheId, received from the control bus through the CacheId input, in the tag field 118. This identifies the first memory line 102 as owned by the accessing processor 12, 14, 16, 18 which was identified by the input through the CacheId input. The method then ends.

If in step 210 the GONE code did not match the data held in the check field 112, the method continues in step 236 of FIG. 7B. In step 236, the memory sequencer 122 determines if the G bit is equal to 0. The G bit is held in the g bit field 116. If the G bit is equal to 0, the method continues in step 238. This is the rare situation where the data contained in memory line 102 is not owned, but the data held in the check field 114, by chance, matches the GONE code generated from the address for memory line 102. This is the situation where a second read function must be executed. In step 238, the memory sequencer 122 signals the data storage 92 to read the D bit contained in the d bit field 110 and to provide the D bit to the memory sequencer 122. In step 240, the memory sequencer 122 sets the G bit equal to the D bit. Since the data contained in the memory line 102 is not owned and the data contained in the check field 112 happened to match the GONE code, the G bit was forced to 0. This 0 value for the G bit indicates that the data is not owned. The D bit is the actual data value of the bit occupied by the G bit. By setting the G bit equal to the D bit before outputting the data, the memory sequencer 122 restores the true value of the bit occupied by the G bit. Next, in step 242, the memory sequencer 122 transfers the first word of the first memory line 102, with the restored D bit, to the data buffer 124 and signals the data buffer 124 and data storage 92 to output the contents of the first memory line 102 onto the data bus of the bus 22. The memory sequencer 122 also generates and outputs a NONE Status signal.

The memory sequencer 122 then, in step 246, signals the data storage 122 to store the GONE code, generated in step 204, in the check field 114, a 1 in the g bit field 116, and the CacheId, received from the control bus through the CacheId input, in the tag field 118. This identifies the first memory line 102 as owned by the accessing processor 12, 14, 16, 18 which was identified by the input through the CacheId input. The method then ends.

If in step 236 the G bit was not equal to 0, then the first memory line 102 is owned by a processor 12, 14, 16, 18 and the data storage 92 does not have valid data. The accessing processor 12, 14, 16, 18 must request the data from the owning processor 12, 14, 16, 18. In step 244, the memory sequencer 122 determines if the CacheId signal matches the tag held in the tag field 118. If the CacheId signal matches the tag, the method continues in step 248. In step 250, the memory sequencer 122 generates and outputs a SAME Status signal. This is usually an error condition, and the method ends. If in step 244 the tag does not match the CacheId input, the memory sequencer 122 generates, in step 248, a DIFF Status signal and outputs this signal onto the control bus of the bus 22. The accessing processor 12, 14, 16, 18 will receive this signal and, having already received the tag output in step 206, will request the data from the owning processor 12, 14, 16, 18. The memory sequencer 122 assumes that the accessing processor 12, 14, 16, 18 will receive the data from the owning processor 12, 14, 16, 18. Therefore, the method proceeds to step 246 where the memory sequencer 122 identifies the first memory line 102 as owned by the accessing processor 12, 14, 16, 18. The method then ends.

If in step 208 the command is not a ReadOwned command, the command must be a WriteReturn command. In step 216 the memory sequencer 122 determines if the data contained in the check field 114 matches the GONE code and if the G bit, held in the g bit field 116, is 1. If either condition is false, then the first memory line 102 is not owned. This is usually an error condition. In step 218, the memory sequencer 122 generates and outputs a NONE Status signal. After step 218, the method ends.

If both conditions of step 216 are true, the first memory line 102 is owned. In step 220, the memory sequencer 122 determines if the data contained in the tag field 118 matches the CacheId received through the CacheId input. If the tag matches the CacheId, then the accessing processor 12, 14, 16, 18 is the owner. If there is no match, the memory sequencer 122 generates a DIFF Status signal in step 222, outputs the DIFF Status signal, and the method ends.

If the accessing processor 12, 14, 16, 18 is the owner, then the method continues in step 224 of FIG. 7C. In step 224, the memory sequencer 122 determines if the first bits of the incoming data match the GONE code. Note that the memory sequencer 122 is comparing the incoming data to the GONE code. In step 216, the memory sequencer 122 compared the data already contained in the first memory line 102 to the GONE code. If there is no match in step 224, the memory sequencer 122 signals, in step 226, the data buffer 124 and data storage 92 to store the data in the first memory line 102. The memory sequencer 122 generates and outputs a SAME Status signal, and the method ends. If in step 224 there is a match, the memory sequencer 122 sets the D bit equal to the G bit in step 228. The memory sequencer 122 then in step 230 signals the data storage to store the D bit in the d bit field 110. In step 232, the memory sequencer 122 sets the G bit equal to 0, and in step 234 the memory sequencer 122 signals the data buffer 124 and data storage 92 to store the data in the first memory line 102. The data storage 92 stores the data with the G bit set to 0. The memory sequencer 122 then generates and outputs a SAME Status signal, and the method ends.

While the present invention has been described with reference to certain preferred embodiments, those skilled in the art will recognize that various modifications may be provided. For example, the present invention is described for performing certain memory operations, the present invention may be used to perform any operation. The g bit field need not comprise only one bit. The g bit field may comprise more than one bit and may contain data in addition to data indicating that, despite matching check field data and GONE code values, the memory line is unowned and contains data. These and other variations upon and modifications to the preferred embodiments are provided for by the present invention, which is limited only by the following claims.

What is claimed is:

1. A memory system for a computer system having a plurality of processors, the memory system comprising:

a data storage device having address and data inputs, outputs, a command input, a plurality of memory lines, and a bit field portion, each memory line having a tag field portion for holding a processor identification code when not being used to hold data and having a check field portion for holding a GONE code, the bit field portion having at least one bit for each memory line for holding a flag indicates whether the tag field portion of the memory line holds said processor identification code; and a memory controller having inputs and outputs coupled to communicate commands, addresses, and data with the processors, the memory controller coupled to the data storage device for storing and retrieving data and processor identification codes in the tag field portions of the memory lines, said GONE code in the check field portion of a memory line when the tag field portion thereof contains said processor identification code, and the flags in the bit field portion of the data storage device, the memory controller using information received from the processors to determine the appropriate updating of the flags for properly indicating which tag field portions contain said processor identification code;

wherein the memory controller further comprises:

a data buffer, having inputs and outputs coupled to the data inputs and outputs of the data storage device, for receiving and outputting data;

an address buffer, having inputs coupled to the plurality of processors, and having inputs and outputs coupled to the address inputs of the data storage device, for receiving addresses; and a memory sequencer, having inputs and outputs, the outputs coupled to control input of the data storage device, the address buffer, and the data buffer, generating signals that instruct the data storage device to store and retrieve said data and said processor identification codes for updating the bit field portion of the data storage device.

2. The memory system of claim 1, further comprising a plurality of t bit fields, each t bit field being assigned to a corresponding memory line for confirming whether the tag field portion of said memory line holds a processor identification code.

3. The memory system of claim 1, wherein each memory line further comprises a g bit field for confirming whether the check field portion of the memory line holds the GONE code, thereby indicating whether the tag field portion of the memory line holds a processor identification code.

4. The memory system of claim 3, wherein a g bit field is one or more bits of a memory line, and wherein the bit field portion comprises a plurality of d bit fields, with each memory line having an assigned d bit field for holding data for the portion of the memory line occupied by the g bit field.

5. The memory system of claim 1, wherein a memory line has an address, and wherein the GONE code for the memory line is a result of a hashing function applied to the address of the memory line.

6. The memory system of claim 1, wherein the memory sequencer contains combinational logic.

7. The memory system of claim 1, wherein each memory line of the data storage device has an unique address and the GONE code is based on the address.

8. The memory system of claim 7, wherein the GONE code held in the check field of a memory line is a result of a hashing function performed on the address of the memory line.

9. A method for reading a data storage device having memory lines addressed by memory addresses, the method comprising the steps of:

receiving a memory address for requested data and a read command from a processor;

retrieving from the data storage device information held in the memory line addressed by the memory address;

generating a GONE code for the memory line;

comparing the GONE code to the information retrieved;

outputting the information retrieved as the requested data if the GONE code does not match the information retrieved;

generating a signal indicating that a processor holds the requested data if the GONE code matches the information retrieved;

determining whether a G bit indicates that a processor holds requested data of the memory address, if the GONE code matches the information retrieved;

retrieving a D bit if the G bit indicates that a processor does not hold the requested data and the GONE code matches the information retrieved; and outputting the information retrieved as the requested data, with the D bit replacing the G bit, if in the determining step the G bit indicated that a processor does not hold the requested data.

10. The method of claim 9, further comprising the steps of:

generating a signal indicating that a processor holds the requested data if in the determining step the G bit indicated that a processor holds the requested data; and modifying the information being held in the memory line addressed by the memory address so that it identifies the processor that generated the read command.

11. The method of claim 9, wherein the step of outputting comprises the steps of:

outputting the information retrieved;

storing the GONE code in the memory line addressed by the memory address;

storing a G bit in the memory line, the G bit indicating that a processor holds the requested data; and storing the identity of the processor which generated the read command in the memory line.

12. A method for writing a data storage device having memory lines addressed by memory addresses, the method comprising the steps of:

receiving a processor identifier, a write command, a memory address, and data from a processor;

generating a GONE code for the memory line addressed by the memory address;

comparing the GONE code to information being held in the memory line;

comparing the processor identifier to the information being held in the memory line if the GONE code matches the information being held in the memory line;

generating a first signal indicating that a different processor than the processor that generated the write command owns a right to provide data addressed by the memory address, if the GONE code matches and the processor identifier does not match the information being held in the memory line, otherwise generating a second signal indicating that the processor that generated the write command has a right to write the memory line; and storing the data received in the receiving step in the memory line unless said different processor owns a right to provide data addressed;

wherein the step of storing further comprises the steps of:

storing the data, received in the receiving step, in the memory line addressed by the memory address;

comparing the data, received in the receiving step, to the GONE code for the memory line;

recording data value of a G bit taken from the data as a D bit, if the data matches the GONE code for the memory line; and setting the G bit to indicate that the data is not held by the processor if the data matches the GONE code for the memory line.

13. A system for reading a data storage device having memory lines addressed by memory addresses, the system comprising:

means for receiving a memory address for requested data and a read command from a processor;

means for retrieving from the data storage device information held in the memory line addressed by the memory address;

means for generating a GONE code for the memory line;

means for comparing the GONE code to the information retrieved;

means for outputting the information retrieved as the requested data if the GONE code does not match the information retrieved;

means for generating a signal indicating that a processor holds the requested data, if the GONE code matches the information retrieved;

means for determining whether a G bit indicates that a processor holds requested data, if the GONE code matches the information retrieved;

means for retrieving a D bit if the G bit indicates that a processor does not hold the requested data;

means for modifying the G bit equal to the D bit if the G bit indicated that a processor does not hold the requested data; and means for outputting the information retrieved as the requested data, with the modified G bit, if prior to replacement, the G bit indicated that a processor does not hold the requested data.

14. The system of claim 13, further comprising:

means for generating a signal indicating that a processor holds requested data if in the determining step the G bit indicated that a processor holds the data;

means for generating a signal that indicates the processor that holds the requested data; and means for modifying the information being held in the memory line addressed by the memory address so that it identifies the processor that generated the read command.

15. The system of claim 13, wherein the means for outputting comprises:

means for outputting the retrieved information;

means for storing the GONE code in the memory line addressed by the memory address;

means for storing a G bit in the memory line, the G bit indicating that a processor holds the requested data; and means for storing the identity of the processor that generated the read command in the memory line.

16. A system for writing a data storage device having memory lines addressed by memory addresses, the system comprising:

means for receiving a processor identifier, a write command, a memory address, and data from a processor;

means for generating a GONE code for the memory line addressed by the memory address;

means for comparing the GONE code to information being held in the memory line;

means for comparing the processor identifier to the information being held in the memory line, if the GONE code matches the information being held in the memory line;

means for generating a first signal indicating that a different processor than the processor that generated the write command owns a right to provide data addressed by the memory address if the GONE code matches and the processor identifier does not match the information being held in the memory line;

means for generating a second signal indicating that the processor that generated the write command has a right to write the memory line if either the GONE code does not match or the processor identifier matches the information being held in the memory line; and means for storing the data received in the receiving step in the memory line unless said different processor owns a right to provide data addressed by the memory address;

wherein the means for storing further comprises:

means for storing the data, received by the means for receiving, in the memory line addressed by the memory address;

means for comparing the data, received by the means for receiving, to the GONE code for the memory line;

means for recording data value of a G bit taken from the data as a D bit, if the data matches the GONE code for the memory line; and means for setting the G bit to indicate that the data, received by the means for receiving, is not held by the processor if the data matches the GONE code for the memory line.

17. A memory system for a computer system having a plurality of processors, the memory system comprising:

a data storage device comprising a plurality of memory lines, each memory line having a tag field and a check field, the data storage device further including a bit field; and a memory controller coupled to said plurality of processors for communicating read commands, write commands, and data therewith, the memory controller further coupled to the data storage device for reading and writing data in the memory lines thereof, including in the check and tag fields thereof, in response to said commands, and for reading and writing GONE codes and processor identifiers in the check and tag fields respectively when said fields are not holding data from the processors;

wherein data from plurality of processors can match the GONE codes of the memory lines, and the memory controller writes in the bit field an indication of authenticity of each GONE code written in the check field, and wherein in response to receiving a command to read the first memory line from first processor, the memory controller further supplies the contents thereof to said first processor in response to the contents of the check field matching the GONE code thereof and the contents of the bit field not authenticating said matching of the GONE code thereof.

18. The memory system of claim 17, wherein:

in response to receiving a command to read a memory line from a processor, the controller reads the memory line, supplies the contents thereof to the processor in response to the contents of the check field thereof not matching the GONE code thereof, writes the processor identifier of the processor to the tag field thereof, and writes the GONE code thereof in the check field thereof.

19. The memory system of claim 17, wherein:

in response to receiving a command to write data in a memory line from a processor, the controller reads the check and tag fields thereof, writes the data therein in response to the contents of the check field thereof not matching the GONE code thereof, and writes said data therein in response to the contents of the tag field thereof matching the processor identifier of the processor.

20. A method for writing a data storage device having memory lines addressed by memory addresses, the method comprising the steps of:

receiving a processor identifier, a write command, a memory address, and data from a processor;

generating a GONE code for the memory line addressed by the memory address;

comparing the GONE code to information being held in said memory line;

comparing the processor identifier to said information;

generating a signal in response to either the GONE code not matching said information or the processor identifier matching said information; and storing the data received in the receiving step in the memory line in response to said signal;

wherein the step of storing comprises the steps of:

storing the data, received in the receiving step, in the memory line addressed by the memory address;

comparing the data, received in the receiving step, to the GONE code for the memory line;

recording data value of a G bit taken from the data as a D bit, if the data matches the GONE code for the memory line; and setting the G bit to indicate that the data is not held by a processor if the data matches the GONE code for the memory line.

21. A system for writing a data storage device having memory lines addressed by memory addresses, the system comprising:

means for receiving a processor identifier, a write command, a memory address, and data from a processor;

means for generating a GONE code for the memory line addressed by the memory address;

means for comparing said GONE code to information being held in the memory line;

means for comparing the processor identifier to said information;

means for generating a signal in response to either the GONE code not matching said information or the processor identifier matching said information; and means for storing the data received in the receiving step in the memory line in response to said signal;

wherein the means for storing comprises:

means for storing the data, received by the means for receiving, in the memory line addressed by the memory address;

means for comparing the data, received by the means for receiving, to the GONE code for the memory line;

means for recording data value of a G bit taken from the data as a D bit, if the data matches the GONE code for the memory line; and means for setting the G bit to indicate that the data, received by the means for receiving, is not held by said processor if the data matches the GONE code for the memory line.

* * * * *

UNITED STATES PATENT AND TRADEMARK OFFICE
CERTIFICATE OF CORRECTION

PATENT NO. : 5,895,496

DATED : April 20, 1999

INVENTOR(S) : David V. James, Glen D. Stone

It is certified that error appears in the above-identified patent and that said Letters Patent is hereby corrected as shown below:

```
Title page, item [54] and col. 1, line 1,
In the title replace "AN" with --AND--.
```

Signed and Sealed this

Seventh Day of September, 1999

Attest:

Q. TODD DICKINSON

*Attesting Officer*  *Acting Commissioner of Patents and Trademarks*